(12) United States Patent
Doblmaier et al.

(10) Patent No.: US 6,842,435 B1
(45) Date of Patent: Jan. 11, 2005

(54) CONGESTION MONITORING AND POWER CONTROL FOR A COMMUNICATION SYSTEM

(75) Inventors: Tom Doblmaier, North Wales, PA (US); Richard Moore, Jr., Harleysville, PA (US); T. Randy Nash, Richboro, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/396,605

(22) Filed: Sep. 15, 1999

(51) Int. Cl.[7] .................. H04B 7/185; H04B 7/00; H04Q 7/28
(52) U.S. Cl. .................. 370/318; 370/341; 455/69; 455/522
(58) Field of Search .................. 370/471, 395.1, 370/252, 315, 318, 322, 331, 332, 342, 347, 442, 343, 450, 469, 517, 473, 505, 447, 330, 329, 337, 245, 449, 396; 455/522, 69, 10, 517, 234.1, 233.1, 403; 340/425.2; 714/746–749; 725/106, 107, 111, 123–126, 121, 131, 117; 375/222

(56) References Cited

U.S. PATENT DOCUMENTS

| | | | | |
|---|---|---|---|---|
| 4,533,948 A | * | 8/1985 | McNamara et al. | 358/122 |
| 4,554,579 A | * | 11/1985 | Citta | 725/131 |
| 4,816,825 A | * | 3/1989 | Chan et al. | 375/222 |
| 5,109,384 A | * | 4/1992 | Tseung | 714/748 |
| 5,172,375 A | * | 12/1992 | Kou | 370/322 |
| 5,208,854 A | * | 5/1993 | West, Jr. | 455/234.1 |
| 5,278,892 A | * | 1/1994 | Bolliger et al. | 370/331 |
| 5,440,545 A | * | 8/1995 | Buchholz et al. | 714/748 |
| 5,490,144 A | * | 2/1996 | Tran et al. | 370/349 |
| 5,530,700 A | * | 6/1996 | Tran et al. | 455/517 |
| 5,537,414 A | * | 7/1996 | Takiyasu et al. | 714/749 |
| 5,568,482 A | * | 10/1996 | Li et al. | 370/471 |
| 5,572,517 A | * | 11/1996 | Safadi | 370/50 |
| 5,606,725 A | * | 2/1997 | Hart | 725/131 |
| 5,621,723 A | * | 4/1997 | Walton et al. | 455/522 |
| 5,784,597 A | * | 7/1998 | Chiu et al. | 370/252 |
| 5,818,825 A | * | 10/1998 | Corrigan et al. | 725/126 |
| 5,828,660 A | * | 10/1998 | Baum et al. | 370/343 |
| 5,892,910 A | * | 4/1999 | Safadi | 395/200.47 |
| 5,959,997 A | * | 9/1999 | Moura et al. | 370/347 |
| 6,091,932 A | * | 7/2000 | Langlais | 725/111 |
| 6,233,693 B1 | * | 5/2001 | Berglund et al. | 713/340 |
| 6,252,865 B1 | * | 6/2001 | Walton et al. | 370/342 |
| 6,292,651 B1 | * | 9/2001 | Dapper et al. | 725/106 |
| 6,301,485 B1 | * | 10/2001 | Lee | 455/522 |
| 6,333,937 B1 | * | 12/2001 | Ryan | 370/345 |
| 6,334,047 B1 | * | 12/2001 | Andersson et al. | 455/69 |
| 6,469,991 B1 | * | 10/2002 | Chuah | 370/347 |
| 6,498,785 B1 | * | 12/2002 | Derryberry et al. | 455/522 |
| 6,539,008 B1 | * | 3/2003 | Ahn et al. | 370/442 |
| 6,594,305 B1 | * | 7/2003 | Roeck et al. | 725/111 |

\* cited by examiner

*Primary Examiner*—Duc Ho
*Assistant Examiner*—Phuongchau Ba Nguyen
(74) *Attorney, Agent, or Firm*—Volpe & Koenig, P.C.

(57) ABSTRACT

The invention provides a system which monitors and controls upstream path congestion by utilizing a MAC layer protocol wherein an upstream communication cell is transmitted from a settop box to the headend. The upstream cell contains a message field and a retry count. The retry count is incremented upon failure of each attempt to communicate with the headend within the upstream path. A downstream cell from the headend to the settop terminals contains an acknowledgment field and an optional power control field. Upstream path congestion is monitored by the headend through averaging or other suitable monitoring all of the retry count field data which arrives from the network of settop terminals.

18 Claims, 3 Drawing Sheets

CONGESTION MONITORING AND POWER CONTROL FOR A COMMUNICATION SYSTEM

BACKGROUND

This invention relates generally to cable television (CATV) communication systems. More particularly, the invention relates to a protocol for monitoring congestion on a CATV system and adjusting the power levels of communications between the settop terminals and the headend.

Over the last two decades, the availability of CATV service to individual homes has increased dramatically. A number of different types of CATV communication systems have evolved to provide a broader array of CATV services. Older "one-way" CATV systems primarily provide video programming services which are sent over the CATV physical link in a downstream direction from the headend of CATV system to a plurality of subscriber units.

Bidirectional CATV systems have become increasingly standard in the industry as the popularity and diversity of services has grown. These services may include but are not limited to pay-per-view, interactive banking, home shopping and Internet access. Bidirectional CATV systems support both downstream and upstream communications. Accordingly, individual subscribers may communicate with the headend, other subscribers or service providers within the system. These systems also permit subscribers to select specific video programming or consumer services and pay only for those services which are used. Some of these services, because of their interactive nature, require real-time communication paths between the subscriber units and servers in a headend. Digital cable networks are well suited for such applications. These networks consist of a cable plant which can be viewed as a point-to-multipoint environment, with the point being a headend and the multipoints being individual subscriber units. The coaxial or fiberoptic cable in the plant is considered to be a shared media. Data sent in the upstream direction travels from each subscriber unit toward the headend, while data sent in a downstream direction travels from the headend to the subscriber units.

Typically, a media access control (MAC) layer protocol is utilized to specify how the subscriber units communicate with the headend. A first problem exists in that multiple subscriber units may be simultaneously attempting to send data within the same upstream bandwidth towards the headend, thus causing upstream congestion. A second problem exists because each of the multiple subscriber units is positioned at a different location in the network. Therefore, when the headend is viewed from each of the multiple points, a different cable distance as well as a different number of line amplifiers and taps, and consequently a different attenuation will be experienced by the communications from a given subscriber unit to the headend. Since it is necessary to keep line amplifiers from saturating or letting signals go below the noise floor, upstream power levels should be adjusted for each subscriber unit.

SUMMARY

The system of the present invention includes a headend and a plurality of settop terminals to form a communication network. The system utilizes a MAC layer protocol wherein the MAC layer protocol has an upstream communication cell which is transmitted from a settop terminal to the headend. The upstream cell contains a message field and a retry count field. The retry count field is incremented upon failure of each attempt to communicate with the headend within the upstream path. A downstream cell which is transmitted from the headend to the settop terminals consists of an acknowledgment field and an optional power control field.

Upstream path congestion is monitored by the headend utilizing the retry count field data which arrives from the network of settop terminals. The downstream communication serves to both acknowledge receipt of the upstream cell and to adjust the upstream power level depending upon the location of a particular subscriber unit in the network.

It is therefore an object of the present invention to provide a MAC layer protocol for use in a cable TV network which provides upstream congestion monitoring.

It is a further object of the present invention to provide a MAC layer protocol for a cable network having efficient power level control for the upstream path.

BRIEF DESCRIPTION OF THE DRAWINGS

The invention will now be described by way of example with reference to the accompanying figures of which.

DETAILED DESCRIPTION OF THE PREFERRED EMBODIMENT

Figure 1:
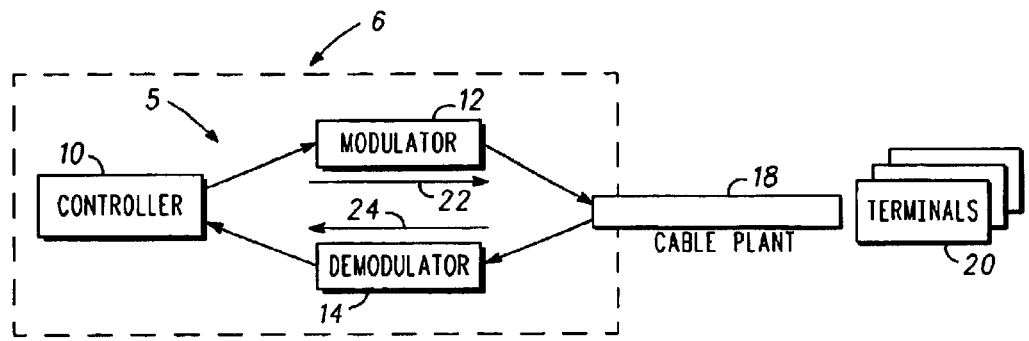
FIG. 1 is a block diagram of a headend and CATV network.

The invention will now be described in greater detail with reference to the drawings, wherein like numerals represent like elements throughout. Referring to FIG. 1, a system 5 for implementation of an interactive media access control (MAC) protocol is shown. The system 5 includes a controller 10, typically located within a headend 6 of a communication network 18. A downstream path 22 is defined as exiting the controller 10 and passing through a modulator 12 into a cable plant 18 to a plurality of settop terminals 20. An upstream path 24 is defined as extending from each of the plurality of settop terminals 20 through the communication network 18, and a demodulator 14 to the controller 10. It should be understood that while the communication network 18 is shown here as a cable plant, it is not intended to be limited to such a network. This system 5 may alternatively be implemented utilizing an optical, wireless, or other suitable network.

Each of the major components will now be described in greater detail. First, a controller 10 acts as a gateway between two networks. For example, the controller 10 may be connected to a local server internet protocol (IP) network which is not shown in FIG. 1. In such an application, the controller 10 would serve as an IP gateway between the local server network and a CATV communication network shown in FIG. 1. The controller 10 may utilize any currently available hardware capable of controlling downstream and upstream communication paths 22, 24. For example, headend products utilizing commercially available Motorola processors such as 68360 or MPC 860 would be suitable for this application. It is preferred however to utilize a standard PC platform with an Intel Pentium processor for the controller 10. It should be understood that other processor platforms could be utilized for the controller 10.

The modulator 12 receives output from the controller 10 along the downstream path 22. The modulator 12 modulates downstream signals exiting the controller 10 to be injected into the communication network 18. Any suitable modulation scheme may be used such as: QPSK or 64QAM. A return path demodulator 14 is connected to the communication network 18 along the upstream path 24. The demodulator receives modulated upstream data signals being transmitted from settop terminals 20 through the communication network 18 and demodulates these signals which are then output to the controller 10.

Figure 2:
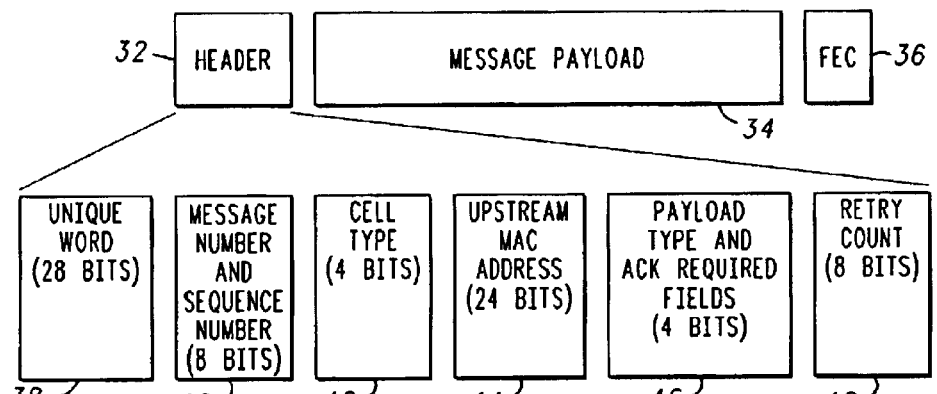
FIG. 2 is a diagram of an upstream data cell.

The communication network 18 comprises a CATV plant connected to a series of settop terminals 20. The settop terminals 20 have the capability to both receive and send data. The settop terminals 20 are preferably digital but may also be analog. The settop terminals 20 receive data through the downstream path 22 and send data through the upstream path 24. It is preferred that these communications be real time for interactive applications at the settop terminals 20. The communications in the downstream path 22 are transmitted in bursts while the upstream path 24 is transmitted as a stream of cells. Referring now to FIG. 2, an upstream data cell 30 will be described in greater detail. The upstream data cell 30 comprises a header 32 followed by a message payload 34 and a forward error correction (FEC) field 36. It should be understood that such a data cell 30 originates at a settop terminal 20 and travels through the communication network 18 to the controller 10 through the upstream path 24.

The header 32 of the upstream cell 30 contains a unique word 38, a message number 40, a sequence number 40, a cell type 42, an upstream MAC address 44, a payload type field 46, an acknowledgment required field 46, and a retry count 48. The upstream source address is preferably assigned by the controller 10. The unique word 38 is a unique pattern which is recognized by the demodulator 14 (FIG. 1) as being the start of a new cell in a burst transmission. The message number 40 identifies the message associated with a transmitted cell. Since each settop terminal 20 can transmit multiple messages during an interval, this message number 40 serves to identify which message contains the transmitted cell. The sequence number 40 identifies a cell's location in a message containing multiple cells. The cell type 42 identifies the type of cell being transmitted. For example, the cell may be identified as a signaling message, an interactive data message or a traditional polling response. The upstream MAC address 44 is an address used to identify the settop terminal 20. This address 44 is unique to each settop terminal 20 and is assigned by the controller 10 during initialization. The payload type field 46 indicates whether the transmitted cell is the last cell in a message. The acknowledgment required field 46 indicates whether the transmitting settop terminal 20 requires an acknowledgment from the controller 10. It can be appreciated that the protocol supports both acknowledged and unacknowledged transmissions. As will be described in greater detail below, the retry count 48 serves to track the number of times a settop terminal 20 must retry sending an upstream message before receiving acknowledgment from the controller 10.

Figure 3:
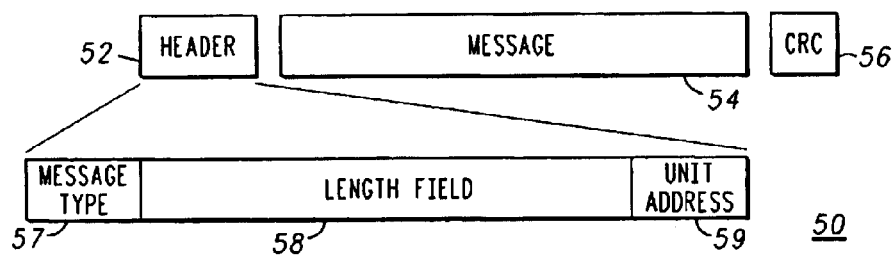
FIG. 3 is a diagram of a downstream data cell.

Referring now to FIG. 3, a downstream data cell 50 consists of a header 52 followed by a message 54 followed by a cyclic redundancy check (CRC) field 56. The downstream cell header 52 includes a message type 57, a length field 58, and a unit address 59. The message type 57 indicates the type of message being transmitted for example, it could be a signaling message or a data message. The length field 58 indicates the length of the message and the unit address 59 identifies the settop terminal 20 which is to receive the message.

Figure 4:
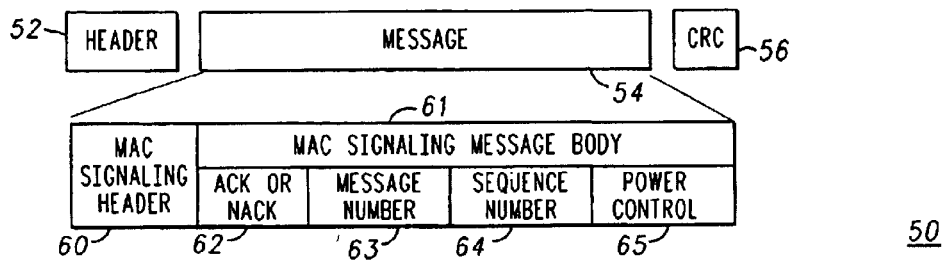
FIG. 4 is a diagram of the message portion of a downstream data cell containing a MAC acknowledgment message.

Referring now to FIG. 4, a message 54 of the downstream data cell 50 will now be described in greater detail. It should be understood that the message which will be described is an acknowledge downstream message. Other information is transmitted in subsequent or previous messages 54 in time. Therefore, every downstream cell does not necessarily contain an acknowledge message but may contain other information. Only the acknowledge message will be described here so that further reference to message 54 will be understood to include only an acknowledge message. Included in the message 54 are a MAC signaling header 60 and a MAC signaling message body 61. The MAC signaling header 60 includes a MAC message type field (not shown).

Within the MAC signaling body 61 are an acknowledgment field 62 followed by a message number 63, a sequence number 64 and a power control field 65. The acknowledgment field 62 is an indication of whether the controller 10 has acknowledged the upstream communication from a settop terminal 20. The message number 63 is similar to the message number 40 in that it identifies the message associated with a transmitted cell. Since the controller 10 can transmit multiple messages during an interval, this message number 63 serves to identify which message contains the transmitted cell. The sequence number 64 is similar to sequence number 40 and identifies a cell's location within a message containing multiple cells. Finally, the power control field 65 indicates the amount of adjustment needed within a settop terminal 20 in 0.5 dB increments. For example, if the power level received at the controller 10 is sufficient, the power control field 65 will be set to zero. However, if for example, a received cell is transmitted at a power level which is 1.5 dB too low, the power control field 65 will be set to three, indicating that three increments of 0.5 dB are necessary in order for the settop terminal 20 to transmit at an acceptable power level.

In operation, the system 5 utilizes a contention-based MAC protocol in which settop terminals 20 transmit data whenever they have data to send. The controller 10 must provide feedback to the transmitting settop terminal 20 to allow it to determine if its transmission was successfully received by the controller 10 at the headend 6. The conditions which may cause the transmission to not be received by the controller 10 include collisions with other signals on the upstream path 24 or attenuation experienced on the upstream path 24. In the event that an acknowledgment is not received by the settop terminal 20, it will wait a random amount of time and then retransmit the information. Upon a specified number of retransmissions, the retry count 48 shown in FIG. 2 is incremented. Preferably, the retry count 48 is incremented after each retransmission.

Figure 5:
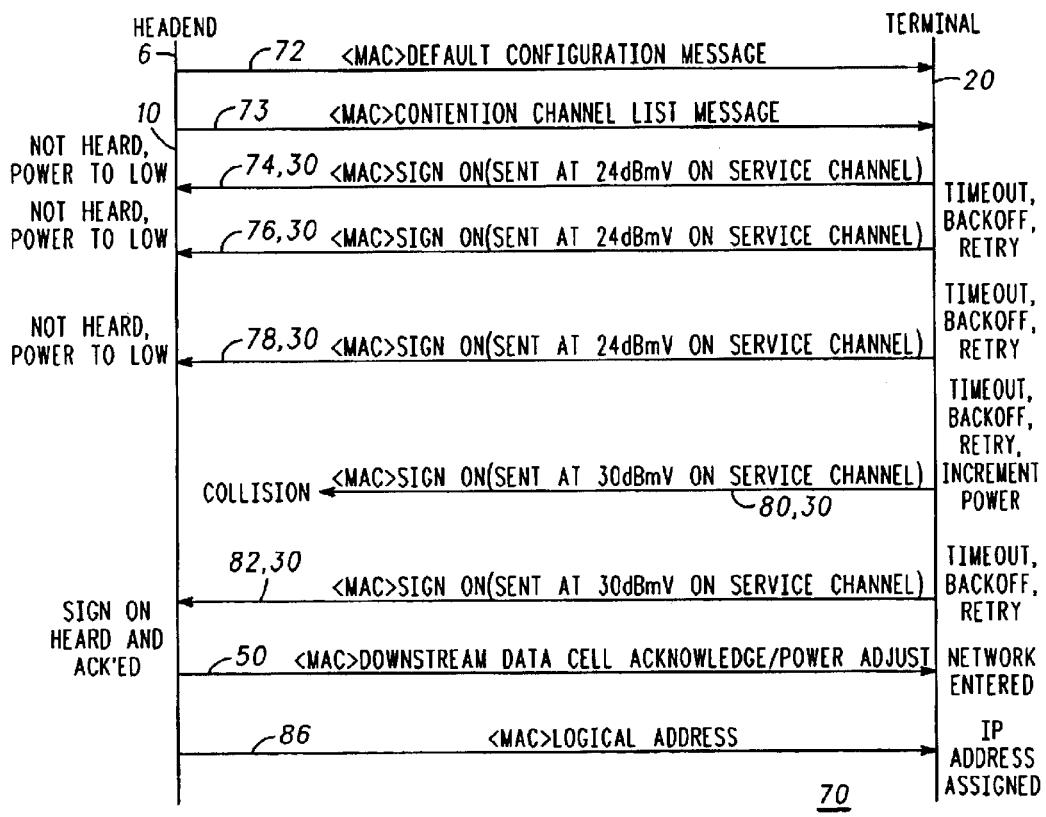
FIG. 5 is a flow diagram of a successful network entry sequence.

Referring now to FIG. 5, the communications network entry sequence 70 in accordance with the present invention is shown. First, the headend 6 broadcasts a default configuration message 72 and a set of contention channel list messages 73 at a specified interval from the controller 10 to a settop terminal 20. Upon receiving the default configuration and contention channel list messages 72, 73 from the controller 10, the settop terminal 20 sends a sign-on request 74 at the specified frequency comprising an upstream data cell 30, which is transmitted at a specified initial power level, for example, at 24 dBmV, as shown in FIG. 5.

If the controller 10 does not receive the upstream data cell 30, no acknowledgment is sent to the settop terminal 20. A second sign-on request 76 is sent from the settop terminal 20 to the controller 10 and the retry count 48 (FIG. 2) is incremented. The second sign-on request 76 is transmitted at the same power level as the first request 74. If this second request 76 is once again not heard or acknowledged by the controller 10, a third sign-on request 78 is sent from the settop terminal 20 to the controller 10. The retry count 48 is then incremented. Again, this sign-on request 78 is sent at the same power level as the previous two sign-on requests 74, 76.

It should be noted here that without receiving any acknowledgment from the controller 10, the settop terminal 20 will wait a random amount of time before each retry sign-on request. This lessens the likelihood that if a retry is caused by a collision, the settop terminal 20 will not attempt to retry at the same time, thereby resulting in another collision. It should also be understood that the first three sign-on requests 74, 76, 78 were not acknowledged by the controller 10 because the power level was too low. However, an unacknowledged sign-on request could also result from a collision which occurred along the upstream path 24 as will be described below.

Upon a specified number of retries, the power level is incremented by the settop terminal 20. In this case, the specified number of retries is three. However, it should be understood by those reasonably skilled in the art that the specified number of retries may vary depending upon the system architecture and specifications. The fourth sign-on request 80 is sent at an incremented power level, which in this embodiment is shown as 30 dBmV. Assuming that this sign-on request 80 experiences a collision with another upstream signal, the settop terminal 20 will once again wait a random period of time and then retransmit the sign-on request 82 again at the higher power level of 30 dBmV. Assuming that the controller 10 has heard the request for sign-on 82, it detects the power level of the request 82, and sends a downstream data cell 50 including an acknowledgment 62 (FIG. 4) through the downstream path 22 to the settop terminal 20. The controller 10 then sends a frequency assignment and logical address 86 to the settop terminal 20.

The power control field 65 is incremented by the controller 10 depending the power level detected. The value of the power control field 65 is an integer corresponding to an increment of power adjustment necessary. For example, an increment of 0.5 dBmv could be selected so that a value of one in the power control field 65 represents a 0.5 dBmv adjustment while a value of two represents a 1 dBmv adjustment, a value of three represents a 1.5 dBmv adjustment and so on. It should be understood by those reasonably skilled in the art that the power control field 65 is optional and may be transmitted through a separate downstream message. However, it is preferred to transmit the power control field 65 as part of the downstream cell 50. The power control field 65 could be optionally removed or set to zero where no power control function is desired. It should also be understood that while the downstream data cell 50 was described with reference to the communications network entry sequence 70, subsequent downstream cells being transmitted at regular intervals also include the power control field 65 for a continuous power level correction along the upstream path 24. It should also be understood that the power control field 65 may optionally be utilized only during downstream communication after the network entry sequence 70 or only during the network entry sequence 70 as described above. The settop terminal 20 receiving the downstream cell 50 adjusts its power level in increments according to the value of the power control field 65

Figure 6:
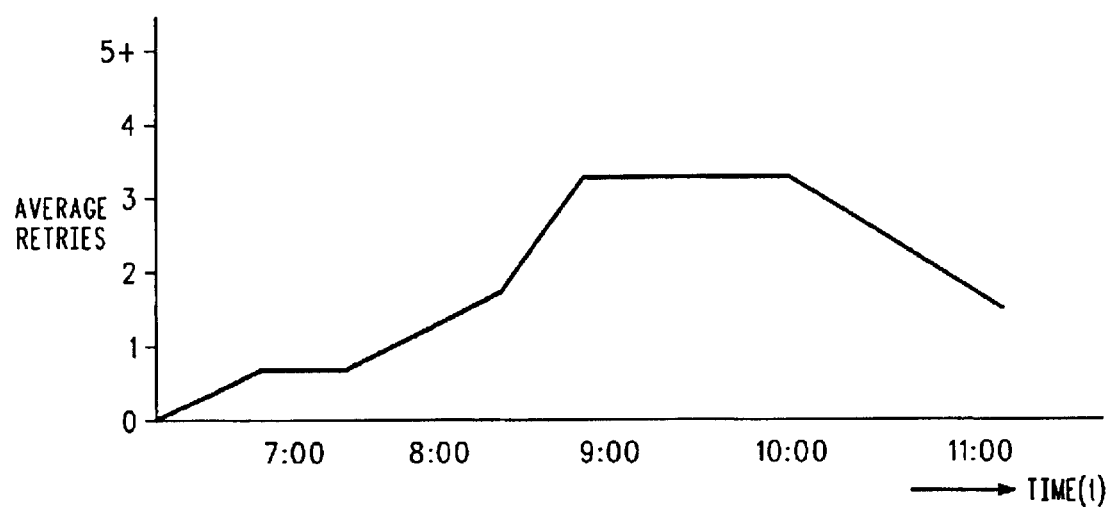
FIG. 6 is a graph of average retries versus time indicating congestion in the upstream path.

Referring now to FIG. 6, a graph of average number of retries versus time is shown as processed by the controller 10. As the average number of retries increases, this is an indication of congestion within the upstream path 24. Recall that with each retry transmission from a settop terminal 20, its respective retry count field 48 is incremented by one. Upon sending an acknowledgment, the controller 10 stores the retry count field 48 and averages it with the other retry count fields 48 received within a specified period of time. Thus, a moving average number of retries is maintained by the controller 10 to indicate the amount of congestion within the upstream path 24. For example, FIG. 6 shows that at time 7:00, the average number of retries is less than one, indicating minimal upstream path 24 congestion. At time 9:00, the average number of retries have risen to three, indicating increased congestion within the upstream path 24. Since increased upstream path 24 congestion adversely effects interactive real time communications, appropriate corrective action may be taken by the system operator to correct this condition and reduce the upstream path 24 congestion and average retries as shown at time 11:00. It should be understood that the averaging technique is only one of many techniques which may be used for monitoring congestion. For example, the retry data may be fed into more sophisticated algorithms such as those which incorporate a sliding window in time or other suitable algorithms which provide an indication of system congestion.

An advantage of the present invention is that by incorporating the power control field 65 into the downstream cell 50, the need for additional downstream messages is eliminated. This conserves downstream bandwidth to permit faster and more efficient communications because the settop terminals 20 receive regular and immediate feedback regarding their power levels.

An additional advantage of the present invention is that by monitoring average number of tetries as an indication of congestion, a network operator can assess the response times being experienced by settop terminal users. This assessment is useful in system planning for future network expansion.

While the invention has been shown here in the form of the embodiments of FIGS. 1–6 it should be understood by those reasonably skilled in the art that minor changes or variations to the systems shown here are intended to be within the spirit of the invention. Therefore the invention is intended to be limited only by the scope of the following claims.

What is claimed is:

1. A media access control protocol for use in a communication system having a headend and a plurality of terminals, the media access control protocol comprising:
   an upstream cell communicating from one of the plurality of terminals to the headend, said upstream cell including a message field and a retry count field, wherein the retry count is used by the headend to control the upstream power level by determining a value for adjusting the upstream power level of one of the plurality of terminals;
   a downstream cell communicating from the headend to one of the plurality of terminals, said downstream cell including an acknowledgment field.

2. The media access control protocol according to claim 1 wherein said upstream cell further includes a unique word field.

3. The media access control protocol according to claim 1 wherein said upstream cell further includes a message number field.

4. The media access control protocol according to claim 1 wherein said upstream cell further includes a sequence number field.

5. The media access control protocol according to claim 1 wherein said upstream cell further includes a cell type field.

6. The media access control protocol according to claim 1 wherein said upstream cell further includes an upstream media access control address field.

7. The media access control protocol according to claim 1 wherein said upstream cell further includes a payload type field.

8. The media access control protocol according to claim 1 wherein said upstream cell further includes an acknowledgment required field.

9. The media access control protocol according to claim 1 wherein said downstream cell further includes a power control field, the power control field including a value for adjusting the upstream power level of one of the plurality of terminals.

10. The media access control protocol according to claim 9 wherein one of the plurality of terminals receives said downstream cell and adjusts the power level of said upstream cell in response to the value of the power control field.

11. The media access control protocol according to claim 1 wherein said downstream cell further includes a message number field.

12. The media access control protocol according to claim 1 wherein said downstream cell further includes a sequence number field.

13. A communication system comprising:

a controller at a headend;

a network; and a plurality of terminals disposed throughout said network at locations remote from said headend whereby each terminal is configured to send an upstream cell toward said headend, each upstream cell having a retry count, said controller being configured to receive and monitor the retry counts, whereby said controller uses the retry count value to provide a value for adjusting a transmission power level of the upstream cell.

14. The communication system according to claim 13 wherein said controller is configured to send downstream cells to said plurality of terminals, each downstream cell including an acknowledgment field.

15. The communication system according to claim 14 wherein each downstream cell further includes a power control field.

16. The communication system according to claim 15 wherein the power control field contains a value indicative of incremental power adjustments requested for transmission of an upstream cell by a terminal.

17. The communication system according to claim 16 wherein the power control field value is an integer representation of a 0.5 dBmv increment.

18. The communication system according to claim 16 wherein said controller sets the power control field value in response to a power level detected from the upstream cell.

* * * * *

UNITED STATES PATENT AND TRADEMARK OFFICE
CERTIFICATE OF CORRECTION

| | | |
|---|---|---|
| PATENT NO. | : 6,842,435 B1 | Page 1 of 1 |
| APPLICATION NO. | : 09/396605 | |
| DATED | : January 11, 2005 | |
| INVENTOR(S) | : Doblmaier et al. | |

It is certified that error appears in the above-identified patent and that said Letters Patent is hereby corrected as shown below:

IN THE SPECIFICATION

At column 6, line 37, after the words "number of", delete "tetries" and insert therefor --retries--.

IN THE CLAIMS

In claim 1, at column 6, line 55, after the word "count", delete "is" and insert therefor --field indicates a number of times a terminal must resend an upstream communication before receiving acknowledgement from the headend, the retry count field being--.

In claim 1, at column 6, line 61, after the word "field", insert --, for acknowledging the upstream communication of one of the plurality of terminals--.

In claim 13, at column 8, line 8, after the word "count", insert --field indicating a number of times a terminal must resend an upstream communication before receiving acknowledgment from said controller--.

In claim 13, at column 8, line 11, delete "count value" and insert therefor --counts--.

After claim 18, insert new claim 19 as follows: --19. The communication system according to claim 16 wherein the terminal receiving the power control field adjusts the transmitted power level of subsequent upstream cells in accordance with the value of the power control field.--.

Signed and Sealed this
Thirteenth Day of August, 2013

Teresa Stanek Rea
*Acting Director of the United States Patent and Trademark Office*